Patented Nov. 30, 1926.

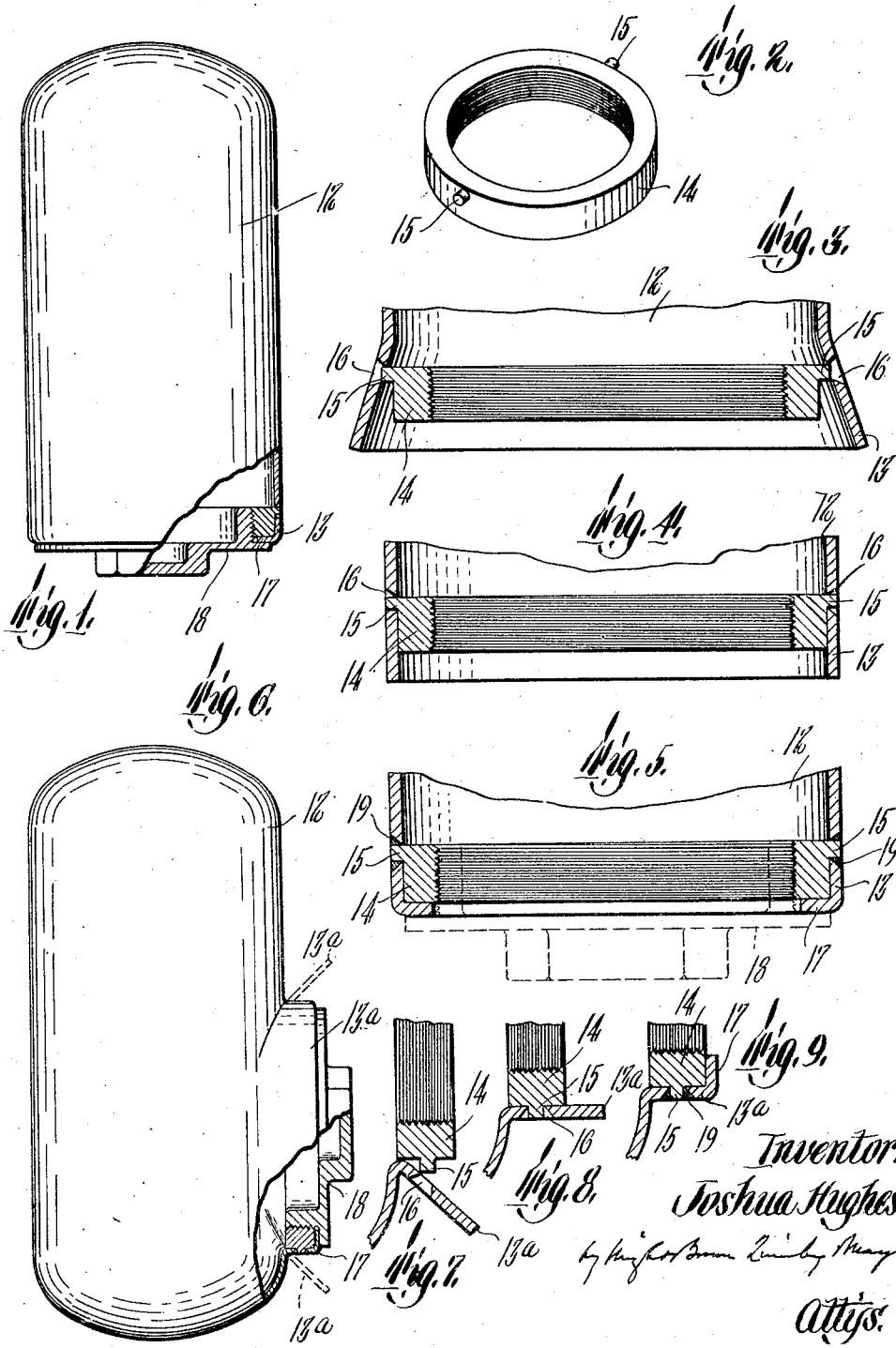

1,609,171

UNITED STATES PATENT OFFICE.

JOSHUA HUGHES, OF BOSTON, MASSACHUSETTS.

REENFORCED PLUMBER'S TRAP AND METHOD OF REENFORCING THE SAME.

Application filed January 11, 1926. Serial No. 80,477.

This invention relates to a plumber's trap, the lead body of which has an annular portion surrounding a clean-out opening, and reenforced by a hard metal screw-threaded bushing, adapted to engage a threaded cover for said opening.

The object of the invention is to provide an improved construction of the lead body and the bushing, permitting a secure and expeditious assemblage of the parts, and providing a lead seat, integral with the body, for the threaded cover, said seat being compressible by the cover, so that a tight joint is formed when the cover is screwed to place.

Of the accompanying drawings forming a part of this specification,—

Figure 1 is a side elevation of a trap, the clean-out opening of which is at one end of the lead body, parts being shown in section.

Figure 2 is a perspective view of the reenforcing bushing.

Figures 3, 4 and 5 are fragmentary sectional views, illustrating the method of assembling the body and the bushing.

Figure 6 is a view similar to Figure 1, showing a trap with a side clean-out opening, portions being shown in section.

Figures 7, 8 and 9 are fragmentary sectional views, illustrating the method of assembling the body and bushing shown by Figure 6.

The same reference characters indicate the same parts in all of the figures.

Referring first to Figures 1 to 5, the cylindrical lead body 12 of a plumber's trap has at one end a flexible annular mouth portion 13, surrounding a clean-out opening, and provided with orifices 16, preferably at diametrically opposite sides of the body.

14 designates an annular reenforcing bushing, preferably of brass, internally screw-threaded and provided with outwardly projecting radial studs 15, arranged to coincide with the orifices 16, and formed to enter the same. The orifices are so spaced from the outer extremity of the mouth portion that when the studs are in the orifices, the outer extremity of the mouth portion projects from the outer side of the bushing. The mouth portion is originally tapered and enlarged, so that the bushing and its studs may be inserted therein, as shown by Figure 3. After the bushing is inserted, the mouth portion is contracted upon the perimeter of the bushing, thus forcing the orifices on to the studs and causing the outer extremity of the mouth portion to project from the outer side of the bushing, as shown by Figure 4. The projecting extremity of the mouth portion is then turned inwardly upon the outer side of the bushing, as shown by Figure 5. A lead seat 17, integral with the body is thus formed, which is compressible by a screw-threaded cover 18, screwed into the bushing, the seat constituting a washer which cooperates with the bushing and cover in forming a tight joint.

The trap body 12, shown by Figures 6, 7, 8 and 9, is provided with a flexible annular tapered mouth portion 13ª projecting from one side of the body, and provided with the orifices 16. Said mouth portion may be provided by forming a small hole in the body and enlarging the hole by suitable means, and in such manner as to form an enlarged flaring mouth portion, as indicated by dotted lines in Figure 1, and by full lines in Figure 7.

The bushing is inserted in the enlarged mouth portion, as indicated by Figure 7, and said portion is then contracted, as shown by Figure 8, and turned inward on the outer side of the bushing, as shown by Figure 9.

The body may be provided by a plumber with the usual inlet and outlet pipes.

The orifices 16 are preferably tapered, as shown by Figure 3, to enable them to be conveniently forced on to the studs. After they are forced on to the studs, solder fillings 19 are inserted in the orifices to form tight joints around the studs.

The bushing 14 has a cylindrical periphery of uniform diameter, from which the spaced apart studs 15 project radially outward. The seat 17 is formed by a flange integral with a zone of the body embracing the periphery of the bushing. Said zone is cylindrical and of uniform diameter, and closely fits the cylindrical periphery of the bushing. The studs 15 project into the orifices 16, and are visible on the external surface of the zone, so that they positively interlock the zone with the bushing and positively confine the flange or seat 17 against the outer side of the zone. The visibility of the studs on the outer surface of the zone indicates to the operator the fact that the parts are properly interlocked.

I claim:

1. A reenforced plumber's trap comprising an annular internally threaded reenforcing bushing having a cylindrical periphery of uniform diameter, and spaced apart radial studs projecting outward from said periphery, and a lead body having an integral annular flange bearing on the outer side of the bushing and forming a cover seat, the body including a cylindrical zone of uniform diameter closely fitting the periphery of the bushing, and provided with orifices into which the studs project, so that they are visible on the external surface of the zone, said zone being positively interlocked with the bushing, and the flange positively confined against the outer side of the bushing by the studs and orifices.

2. The method of making a reenforced plumber's trap, which consists in providing an annular internally threaded reenforcing bushing having outwardly projecting radial studs, forming a lead body with a tapered mouth portion including an inner zone and an outer zone, forming orifices in the inner zone adapted to receive said studs, inserting the bushing in the mouth with the bushing studs registering with the orifices and the outer zone projecting beyond the bushing, contracting the mouth portion to cause the inner zone to bear on the periphery of the bushing and the orifices to receive the studs, thereby positively interlocking the body with the bushing, and finally bending the outer zone to cause it to bear on the outer side of the bushing and form an annular cover seat of a uniform width determined by the studs and orifices.

In testimony whereof I have affixed my signature.

JOSHUA HUGHES.